United States Patent
Campbell

(10) Patent No.: US 6,828,367 B1
(45) Date of Patent: Dec. 7, 2004

(54) ORGANIC MODIFICATION OF A LAYERED SILICATE BY CO-ION EXCHANGE OF AN ALKYL AMMONIUM AND A MONO-PROTONATED DIAMINE

(75) Inventor: Sandi G. Campbell, Akron, OH (US)

(73) Assignee: The United States of America as represented by the United States National Aeronautics and Space Administration, Washington, DC (US)

(*) Notice: Subject to any disclaimer, the term of this patent is extended or adjusted under 35 U.S.C. 154(b) by 295 days.

(21) Appl. No.: 10/251,195

(22) Filed: Sep. 20, 2002

(51) Int. Cl.[7] ................................ C08K 3/34
(52) U.S. Cl. .................. 524/186; 524/445; 524/447; 501/145; 501/148
(58) Field of Search ...................... 524/186, 445, 524/447; 501/145, 148

(56) References Cited

U.S. PATENT DOCUMENTS

| | | |
|---|---|---|
| 5,955,535 A | 9/1999 | Vaia et al. |
| 6,057,035 A | 5/2000 | Singh et al. |
| 6,096,803 A | 8/2000 | Pinnavaia et al. |
| 6,225,374 B1 | 5/2001 | Vaia et al. |
| 6,225,394 B1 | 5/2001 | Lan et al. |
| 6,252,020 B1 | 6/2001 | Kuo et al. |
| 6,323,270 B1 | 11/2001 | Ishida |
| 6,380,295 B1 | 4/2002 | Ross et al. |
| 6,387,996 B1 | 5/2002 | Lan et al. |
| 6,407,155 B1 | 6/2002 | Qian et al. |
| 6,410,142 B1 | 6/2002 | Chen et al. |

*Primary Examiner*—Katarzyna Wyrozebski
(74) *Attorney, Agent, or Firm*—Brouse McDowell; Roger D. Emerson; Daniel A. Thomson

(57) ABSTRACT

Co-Ion exchange of the interlayer cations of a layered silicate with a mono-protonated aromatic diamine and an alkyl ammonium ion into the silicate galleries. The presence of the alkyl ammonium ion provides low oligomer melt viscosity during processing. The presence of the diamine allows chemical reaction between the silicate surface modification and the monomers. This reaction strengthens the polymer silicate interface, and ensures irreversible separation of the individual silicate layers. Improved polymer thermal oxidative stability and mechanical properties are obtained.

16 Claims, 3 Drawing Sheets

US 6,828,367 B1

ORGANIC MODIFICATION OF A LAYERED SILICATE BY CO-ION EXCHANGE OF AN ALKYL AMMONIUM AND A MONO-PROTONATED DIAMINE

BACKGROUND OF THE INVENTION

A. Origin of the Invention

The invention described herein was made by an employee of the United States Government and may be manufactured and used by and for the Government for Government purposes without payment of any royalties thereon or therefore.

B. Field of Invention

This invention pertains to the art of modified silicate clays for dispersion in polymeric matrices. In particular, the present invention is directed to a modified silicate clay formed by a co-ion exchange process with a mono-protonated diamine and alkyl ammonium ions.

C. Description of the Related Art

The nanometer level dispersion of a layered silicate into a polymer matrix typically requires organic modification of the silicate interlayer surface. This modification is easily achieved by ion exchange of the interlayer metal cations found naturally in the silicate, with a protonated organic cation, typically a protonated amine. Long chain alkyl ammonium ions are commonly chosen as the ion exchange material as they effectively lower the surface energy of the silicate and ease the incorporation of organic monomers or polymers into the silicate galleries.

However, in high temperature thermosetting polymers, use of long chain alkyl ammonium ions poses two problems. First, the decomposition temperature of the alkyl chain is commonly lower than the processing temperature of the polymers. Degradation of the organic modifier can result in aggregation of the silicate layers leading to micron level dispersion, rather than nanometer level dispersion of the individual clay platelets. Secondly, the presence of the flexible chains in the rigid polymer matrix has plasticizing effects which can lower the strength and use temperature of the material.

Previous work has demonstrated that ion exchange with an aromatic diamine is a viable method of achieving irreversible swelling of the silicate in a thermoplastic polyimide matrix. However, in a thermosetting polyimide, silicate modification with only the diamine tends to increase the melt viscosity of the system and may affect the polymer structure on curing. As a result, dispersion of this organically modified silicate into a thermosetting polymer matrix may not enhance polymer properties such as strength, modulus, or thermal stability.

The present invention provides a synergistic co-ion exchange process using a mono-protonated aromatic diamine and alkyl ammonium ions. A relatively low level of alkyl ammonium ions is utilized to minimize oligomer melt viscosity without the downfalls of low degradation temperature and plasticization effects.

The co-ion exchange of a protonated aromatic diamine and an alkyl ammonium ion into a silicate clay is unique. This organic modification optimizes the benefits of silicate dispersion into a highly-crosslinked, thermosetting polymer. Co-ion exchange allows irreversible swelling of the silicate layers under elevated processing temperatures, without adversely increasing the melt viscosity. Therefore, the present invention provides a nanocomposite exhibiting improved properties and unexpected results.

SUMMARY OF THE INVENTION

According to one aspect of the present invention, a new and improved clay/organic chemical composition is provided. The clay/organic chemical composition for dispersion in a polymer matrix, wherein the clay/organic chemical composition comprises an ion-exchanged reaction product produced by the intercalation and reaction of:

(a) a clay having a cation exchange capacity;

(b) a synergistically effective amount of alkyl ammonium ion to ion-exchange with interlayer cations to provide minimized oligomer melt viscosity of the polymer matrix without adverse plasticizing effects; and, (c) a synergistically effective amount of a mono-protonated aromatic diamine to provide irreversible swelling of the polymeric matrix, by providing a free amine site that can react with polymer precursors.

According to another aspect of the invention, there is provided a nanocomposite comprising:

(a) a polymer matrix comprising the polymerization of monomer reactants where the monomers are 3,3',4,4'-benzophenonetetracarboxylic acid, methylene dianiline, and 2-carbomethoxy-3-carboxy-5-norbornene (hereinafter, PMR-15); and (b) a layered clay material dispersed in the polymer matrix, the layered clay material being a clay/organic chemical composition comprising an ion-exchanged reaction product produced by the intercalation and reaction of:

(i) a clay having a cation exchange capacity;

(ii) a synergistically effective amount of alkyl ammonium compound to ion-exchange with interlayer cations to provide minimized oligomer melt viscosity of the polymer matrix without adverse plasticizing effects; and, (iii) a synergistically effective amount of a mono-protonated aromatic diamine to provide irreversible swelling of the polymeric matrix.

According to another aspect of the invention there is provided a process for producing a nanocomposite comprising the steps of:

(a) modifying a layered clay material by co-ion exchange with an alkyl ammonium ion and a mono-protonated aromatic diamine;

(b) dispersing the modified layered clay material into a mixture of monomers; and (c) in-situ polymerizing the monomer to obtain a composite having the modified clay material dispersed in a polymeric matrix.

According to another aspect of the invention, there is provided a clay/organic chemical composition formed by reaction of a mono-protonated aromatic di amine and an alkyl ammonium ion with a silicate clay having exchangeable metal cations within the silicate galleries at a plurality of cation exchange sites where interlayer cation exchange takes place, the clay/organic chemical compound comprising:

(a) surface modification by ionic interaction at the silicate surface;

(b) a free (react-able) amine site;

(c) a mono-protonated diamine ion exchanged at a first cation exchange site; and, (d) an alkyl ammonium ion exchanged at a second cation exchange site.

According to another aspect of the invention, there is provided a process for synthesizing a silicate clay reinforced polymer comprising the steps of:

(a) providing a silicate clay having an overall negative charge and interlayer cation exchangeable sites;

(b) modifying the silicate surface by interaction of one amine group of a mono-protonated aromatic diamine with the silicate surface and leaving one amine group free for subsequent interaction;

(c) exchanging cations at the cation exchangeable sites with alkyl ammonium ions;

(d) providing a monomer capable of interaction with the free amine group; and, (e) in situ polymerizing a monomer.

DESCRIPTION OF THE PREFERRED EMBODIMENT

Definitions:

Whenever used in this specification, the terms set forth shall have the following meanings:

"$T_g$" refers to a "glass transition temperature". A preferred method of measuring the $T_g$ is by using a differential scanning calorimeter at a heating rate of 10° C. per minute. "Layered clay," "layered clay material," or "clay material" refers to any organic or inorganic material or mixtures thereof, such as smectite clay mineral, which is in the form of a plurality of adjacent, bound layers. The layered clay comprises platelet particles and is typically swellable.

"Platelet particles," "platelets" or "particles" shall mean individual or aggregate unbound layers of the layered clay material.

"Dispersion" or "dispersed" is a general term that refers to a variety of levels or degrees of separation of the platelet particles. The higher levels of dispersion include, but are not limited to, "intercalated" and "exfoliated."

"Intercalate" is defined as the situation where a material is inserted between the platelets or layers of another material. When a material is intercalated between the platelets of clay it means the material is inserted between the layers such that the distance between the platelets of clay is increased a measurable amount.

"Exfoliate" or "exfoliated" shall mean platelets dispersed predominantly in an individual state throughout a carrier material, such as a matrix polymer.

"Nanocomposite" or "nanocomposite composition" shall mean a polymer or copolymer having dispersed therein a plurality of individual platelets obtained from a layered clay material.

"Matrix polymer" shall mean a polymer in which the platelet particles are dispersed to form a nanocomposite.

"Co-ion exchange" shall mean a process for exchanging the interlayer cations of a layered silicate with more than one type of organic material, either simultaneously or sequentially.

The invention is directed to co-ion exchange of the interlayer cations of a layered silicate with a mono-protonated aromatic diamine and an alkyl ammonium ion. The mono-protonated aromatic diamine essentially tethers one end of the diamine to the silicate, leaving the second amine free for reaction with monomers during polymer synthesis. The presence of the diamine allows chemical reaction between the silicate surface modification and the monomers. This reaction strengthens the polymer silicate interface, and ensures irreversible separation of the individual silicate layers.

Incorporation of the alkyl ammonium ions into the silicate galleries helps to keep the oligomer melt viscosity low during processing.

The presence of the mono-protonated aromatic diamine and the alkyl ammonium ion provide unexpected synergistic results. For example, evaluation of polymer thermal oxidative stability and mechanical properties demonstrates that modification of the silicate surface by co-ion exchange provides superior polymer properties over nanocomposites prepared with traditionally modified silicates.

Useful clay materials include natural, synthetic, and modified phyllosilicates. Illustrative of such natural clays are smectite clays, such as montmorillonite, saponite, hectorite, mica, vermiculite, benonite, nontronite, beidellite, volkonskoite, magadite, kenyaite, and the like. Illustrative of such synthetic clays are synthetic mica, synthetic saponite, synthetic hectorite, and the like. Illustrative of such modified clays are fluorinated montmorillonite, fluoronated mica, and the like.

In the preferred embodiment, the inventive polymer matrix may comprise PMR-15, addition-type thermosetting polyimides, thermoplastic polyimides, and mixtures thereof.

This invention is illustrated by the following examples that are merely for the purpose of illustration and are not to be regarded as limiting the scope of the invention or the manner in which it can be practiced.

EXAMPLE I

Ion exchange process: Ion exchange of the interlayer cations of a silicate clay with the protonated forms of methylene dianiline and dodecylamine was performed by dissolving the amine (2.5 mmol) and the diamine (2.5 mmol) in 450 mL of a 0.005 M aqueous HCl solution at 60° C. The silicate (5 g) was dispersed in the solution and the resultant mixture was stirred at 60° C. for three hours. The solution was filtered and the clay was washed thoroughly with distilled water, which was heated 60° C. To maximize the amount of amine/diamine exchanged, the procedure was repeated for a total of three exchange reactions. The silicate was then dried overnight in a vacuum oven at 100° C.

EXAMPLE II

Nanocomposite Synthesis: PMR-15 resins were fabricated in several steps. Three monomers (2-carbomethoxy-3-carboxy-5-norbornene (NE), methylene dianiline, (MDA), and the dimethyl ester of 3,3',4,4'-benzophenonetetracarboxylic acid (BTDE)), and 1–7 wt % of the organically modified silicate were dissolved in methanol (50 wt %) followed by solvent evaporation, on a hot plate, at 60° to 70° C. B-staging the mixture at 204° to 232° C. in an air circulating oven produces a low molecular weight imide oligomer. The oligomer is then cured in a mold at 315° C. under 2355 psi to produce the crosslinked polymer. The polymer was post cured in an air-circulating oven for 16 hours at 315° C. to further crosslinking.

Carbon fabric reinforced composites with a PMR-15/silicate nanocomposite matrix were prepared. Prepreg was prepared by brush application of the PMR-15 monomer solution onto T650-35 carbon fabric, to give a final fiber content of 60 wt %. The silicate used in the nanocomposite matrix composites was organically modified by co-ion exchange of mono protonated methylene dianiline and protonated dodecylamine. The prepreg sheets were cut into eight, 10.2 cm by 10.2 cm, plies and placed in a metal mold. The mold was initially heated to 232° C. to imidize the monomers. The mold temperature was then raised to 315° C., and the matrix was cured with application of 500 psi for 2 hours. The composites were post cured in an air-circulating oven at 315° C. for 16 hours.

RESULTS

Table 1 illustrates that PGV clay (Trade Name of a montmorillonite clay sold by Nanocor) ion exchanged with just the mono-protonated diamine (MDA) yields no significant change in Tg, positive or negative, when dispersed in a PMR-15 matrix. However, dispersion of PGV clay ion exchanged with an alkyl ammonium ion (protonated dodecylamine, C12, for example) results in a considerable decrease in the Tg of PMR-15. Using both MDA and C12 to modify the clay by co-ion exchange does not result in the same decrease in Tg that is seen with the alkyl ammonium modified clay. No decrease in Tg when using the co-exchanged clay.

TABLE 1

|  | PGV-MDA | PGV(MDA-C12) | PGV-C12 |
| --- | --- | --- | --- |
| 0% silicate | 335 | 335 | 335 |
| 1% silicate | 342 | 336 | 337 |
| 3% silicate | 337 | 340 | 326 |
| 5% silicate | 338 | 337 | 321 |
| 7% silicate | 339 | 338 | 311 |

Figure 1:
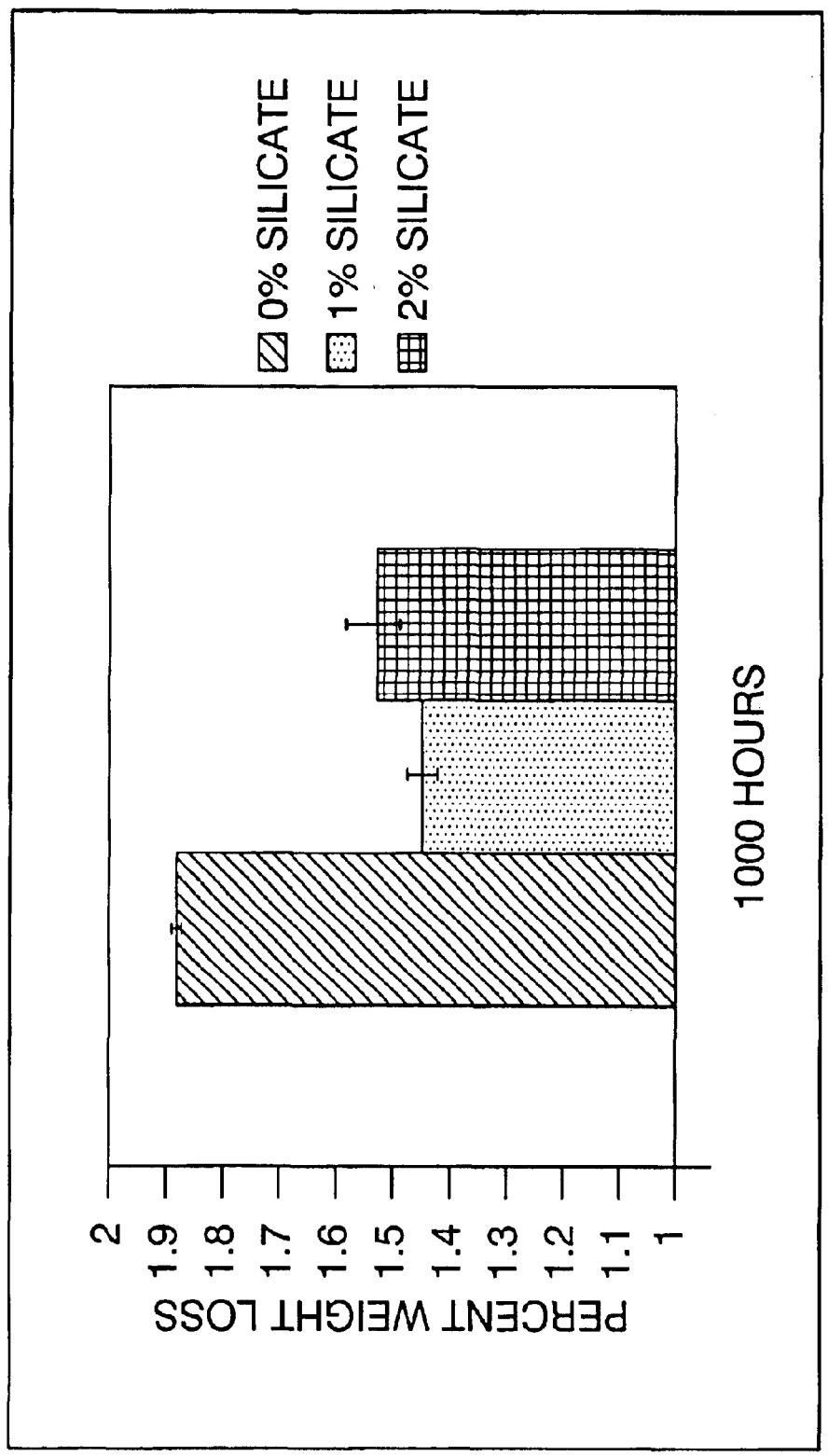
FIG. 1 illustrates weight loss after aging data. As shown, weight loss after aging carbon fabric reinforced composites with a PMR-15/silicate nanocomposite matrix show up to a 25% reduction in weight loss on aging at 288° C. for 1000 hours.
Figure 2:
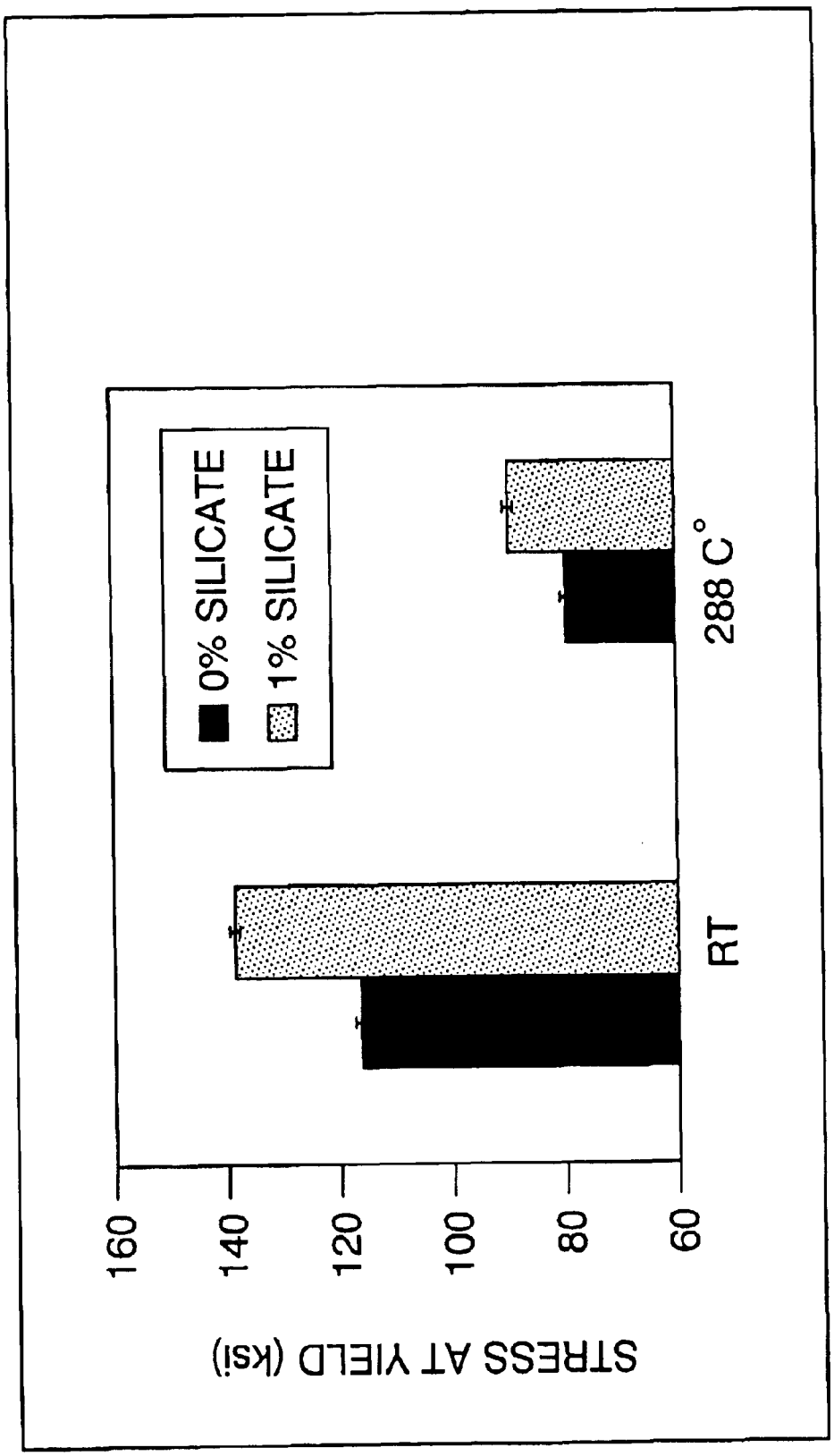
FIG. 2 illustrates the increased strength of the carbon fabric reinforced composites with a PMR-15/silicate nanocomposite as compared to the neat resin matrix composite samples.
Figure 3:
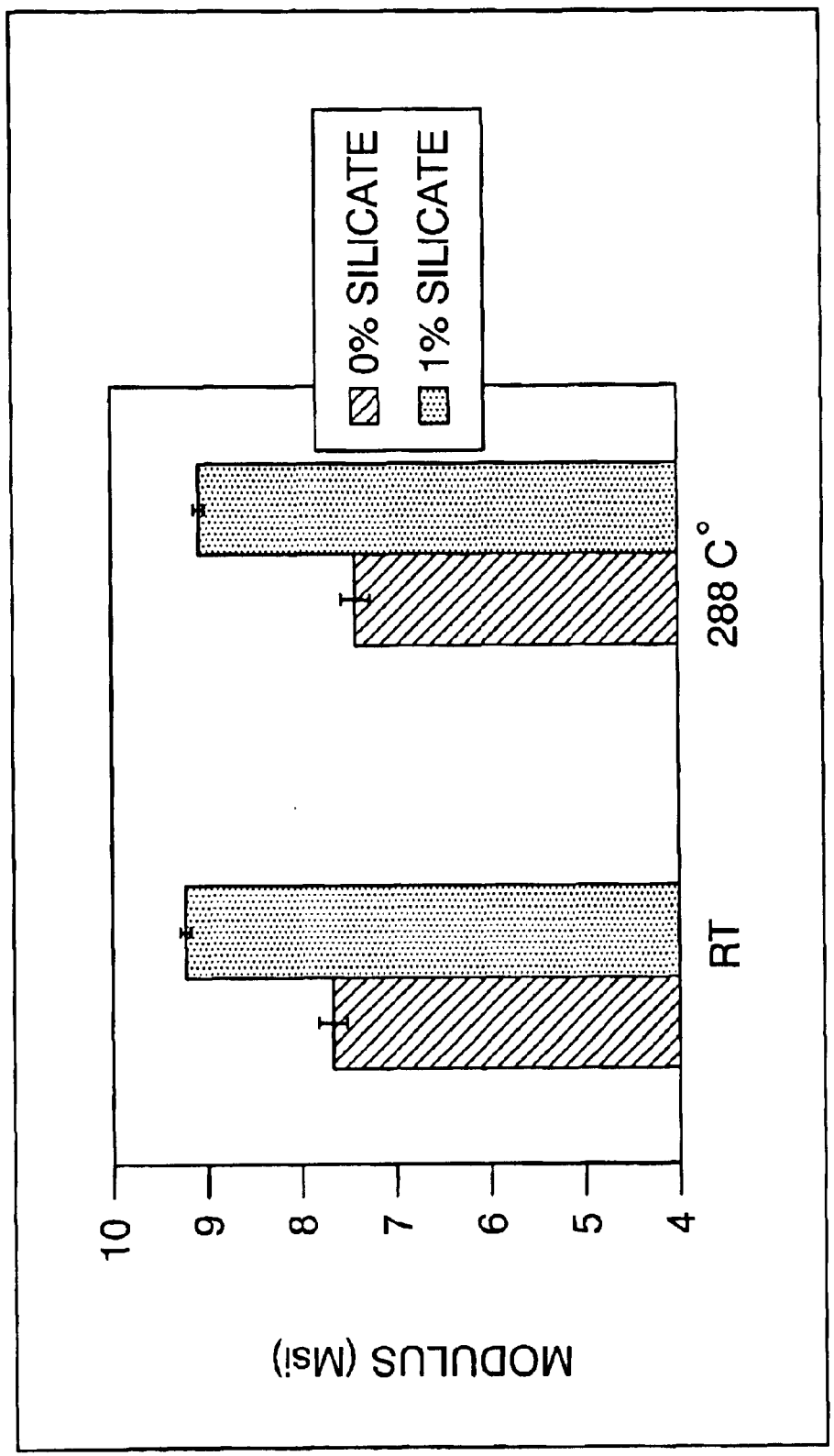
FIG. 3 illustrates the increased modulus of the carbon fabric reinforced composites with a PMR-15/silicate nanocomposite matrix as compared to the neat resin matrix composite samples.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:
I claim:

1. A clay/organic chemical composition useful as an additive to a polymeric matrix to produce a nanocomposite, the clay/organic chemical composition comprising an ion-exchanged reaction product produced by the intercalation and reaction of:
   (a) a clay having a cation exchange capacity;
   (b) a synergistically effective amount of alkyl ammonium compound to provide minimized oligomer melt viscosity of the polymer matrix without adverse plasticizing effects; and,
   (c) a synergistically effective amount of a mono-protonated aromatic diamine to provide irreversible swelling of the polymeric matrix.

2. The clay/organic chemical composition of claim 1 wherein the clay is a layered silicate.

3. The clay/organic chemical composition of claim 1 wherein the clay is a smectite clay.

4. The clay/organic chemical composition of claim 1 wherein the alkyl ammonium compound is a protonated aliphatic amine having a chain length at least as long as a chain length of the mono-protonated diamine.

5. The clay/organic chemical composition of claim 1 wherein the synergistically effective amount of alkyl ammonium compound is about 25% to about 75% by weight.

6. The clay/organic chemical composition of claim 1 wherein the synergistically effective amount of the mono-protonated aromatic diamine is about 25% to about 75% by weight.

7. A nanocomposite comprising:
   (a) a polymer matrix comprising at least one polymer selected from the list consisting of PMR-15, thermosetting polyimide, a thermoplastic polyimides, and mixtures thereof; and
   (b) a layered clay material dispersed in the polymer matrix, the layered clay material being a clay/organic chemical composition comprising an ion-exchanged reaction product produced by the intercalation and reaction of:
      (i) a clay having a cation exchange capacity;
      (ii) a synergistically effective amount of alkyl ammonium compound to provide minimized oligomer melt viscosity of the polymer matrix without adverse plasticizing effects; and,
      (iii) a synergistically effective amount of a mono-protonated aromatic diamine to provide irreversible swelling of the polymeric matrix.

8. A process for producing a nanocomposite comprising the steps of:
   (a) modifying a layered clay material by a co-ion exchange with an alkyl ammonium ion and a mono-protonated aromatic diamine;
   (b) dispersing the modified layered clay material into a monomer; and
   (c) in-situ polymerizing the monomer to obtain a composite having the modified clay material dispersed in a polymeric matrix.

9. The process of claim 8 wherein the step of modifying the layered clay material includes the step of:
   exposing the layered clay material to the alkyl ammonium ion and the mono-protonated aromatic diamine to achieve the co-ion exchange.

10. The process of claim 8 wherein the step of modifying the layered clay material includes the step of:
    simultaneously exposing the layered clay material to the alkyl ammonium ion and the mon-protonated aromatic diamine to achieve the co-ion exchange.

11. The process of claim 9 wherein the step of modifying the layered clay material further includes the step of:
    repeating the step of exposing the layered clay material to the alkyl ammonium ion and the mono-protonated aromatic diamine until the co-ion exchange reaches a predetermined exchange level.

12. The process of claim 8 wherein the step of dispersing the modified clay material into a monomer comprises the step of:
    dispersing about 1% to about 7% by weight of the modified clay material into the monomer.

13. The process of claim 8 wherein the step of in-situ polymerizing the monomer includes the steps of:
    forming a low molecular weight imide oligomer; and,
    curing the oligomer to produce a the nanocomposite.

14. The process of claim 13 wherein the step of curing the oligomer includes the steps of:

initially curing the oligomer under a first set of cure conditions to produce an initial polymer; and, post curing the initial polymer to produce a final polymer.

15. A clay/organic chemical compound formed by reaction of a mono-protonated aromatic diamine and an alkyl ammonium ion with a silicate clay having cation exchange sites, the clay/organic chemical compound comprising:

(a) a mono protonated diamine ion exchanged at a first cation exchange site; and, (b) an alkyl ammonium ion exchanged at a second cation exchange site.

16. A process for synthesizing a silicate clay reinforced polymer comprising the steps of:

(a) providing a silicate clay having a silicate surface and interlayer cation exchangeable sites;

(b) modifying the surface of the silicate surface by interaction of one amine group of a mono-protonated aromatic diamine with the silicate surface and leaving one amine group free for subsequent interaction;

(c) exchanging cations at the cation exchangeable sites with alkyl ammonium ions;

(d) providing a monomer capable of interaction with the free amine group; and, (e) in situ polymerizing the monomer.

* * * * *